US012143931B2

(12) United States Patent
Dixit et al.

(10) Patent No.: US 12,143,931 B2
(45) Date of Patent: Nov. 12, 2024

(54) METHODS FOR SELECTION OF ENERGY SOURCE BASED ON ENERGY RATE CORRELATED WITH RADIO TRAFFIC POWER USAGE AND RELATED APPARATUS

(71) Applicant: Telefonaktiebolaget LM Ericsson (publ), Stockholm (SE)

(72) Inventors: Gaurav Dixit, Sollentuna (SE); Lackis Eleftheriadis, Valbo (SE); Marios Daoutis, Bromma (SE); Rafia Inam, Västerås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 324 days.

(21) Appl. No.: 17/762,870

(22) PCT Filed: Sep. 24, 2019

(86) PCT No.: PCT/SE2019/050906
§ 371 (c)(1),
(2) Date: Mar. 23, 2022

(87) PCT Pub. No.: WO2021/061028
PCT Pub. Date: Apr. 1, 2021

(65) Prior Publication Data
US 2022/0361100 A1    Nov. 10, 2022

(51) Int. Cl.
*H02J 13/00*    (2006.01)
*G06N 20/00*    (2019.01)
(Continued)

(52) U.S. Cl.
CPC ........ *H04W 52/0206* (2013.01); *G06N 20/00* (2019.01); *H02J 13/00002* (2020.01); *H04W 52/18* (2013.01); *H02J 2203/20* (2020.01)

(58) Field of Classification Search
CPC ......... H04W 52/0203; H04W 52/0206; H04W 52/02; G06N 20/00; H02J 13/00002
See application file for complete search history.

(56) References Cited

U.S. PATENT DOCUMENTS

| 2011/0125336 A1 | 5/2011 | Groves et al. |
| 2012/0289224 A1 | 11/2012 | Hallberg et al. |
| 2019/0182766 A1 | 6/2019 | Eleftheriadis et al. |

FOREIGN PATENT DOCUMENTS

| EP | 2912890 A1 | 9/2015 |
| EP | 2510728 B1 | 10/2015 |

(Continued)

OTHER PUBLICATIONS

Niyato et al. Adaptive Power Management for Wireless Base Stations in a Smart Grid Environment, IEEE Wireless Communications, Dec. 2012 (Year: 2012).*

(Continued)

*Primary Examiner* — Kathy W Wang-Hurst
(74) *Attorney, Agent, or Firm* — Sage Patent Group (57) ABSTRACT

A method performed by a control node for a radio access network. The control node may select an energy source from a plurality of energy sources connected to a base station based on selecting an energy rate of one of the energy sources correlated in time with a radio traffic power usage of the base station. The selection may be made from a plurality of energy rates for the plurality of energy rates correlated in time for each energy source with a radio traffic power usage of the base station. The selected energy rate may improve at least one operating parameter of the selected energy source. The control node may activate the selected energy source for use by the base station. A further method performed by a global control node may be provided.

20 Claims, 8 Drawing Sheets (51) Int. Cl.
*H04W 52/02* (2009.01)
*H04W 52/18* (2009.01)

(56) References Cited

FOREIGN PATENT DOCUMENTS

| EP | 3494733 A1 | 6/2019 |
|----|------------|--------|
| WO | 2014070785 A1 | 5/2014 |
| WO | 2017095279 A1 | 6/2017 |
| WO | 2018026319 A1 | 2/2018 |

OTHER PUBLICATIONS

Essays UK, Energy Management for Microgrids Using a Reinforcement Learning Algorithm, Jun. 6, 2019 (Year: 2019).*

International Search Report and Written Opinion of the International Searching Authority for PCT International Application No. PCT/SE2019/050906 dated Jun. 9, 2020.

Essays UK, "Energy Management for Microgrids Using a Reinforcement Learning Algorithm," Dissertation Example, published Jun. 6, 2019, 10 pages.

Kwasinski et al., "Increasing Sustainability and Resiliency of Cellular Network Infrastructure by Harvesting Renewable Energy," IEEE Communications Magazine, Apr. 2015, 7 pages.

Hu et al., "Adaptive mixed strategy load management in do microgrids for wireless communications systems," 2017 IEEE 3rd International Future Energy Electronics Conference and ECCE Asia (IFEEC 2017—ECCE Asia), 2017, pp. 743-748.

Piovesan et al., "Joint Load Control and Energy Sharing for Autonomous Operation of 5G Mobile Networks in Micro-Grids," in IEEE Access, vol. 7, 2019, pp. 31140-31150.

Niyato et al., "Adaptive power management for wireless base stations in a smart grid environment," in IEEE Wireless Communications, vol. 19, No. 6, Dec. 2012, pp. 44-51.

Leithon et al., "Energy management strategies for base stations in a smart grid environment," Transactions on Emerging Telecommunications Technologies, vol. 28, 2017, pp. 1-12.

Examination Report for Indian Patent Application No. 202247023190 dated Sep. 1, 2022.

Communication regarding supplementary European Search Report for European Patent Application No. 19947348.9 dated May 9, 2023 (10 pages).

Elsayed et al., "AI-Enabled Future Wireless Networks: Challenges, Opportunities, and Open Issues," IEEE Vehicular Technology Magazine, vol. 14, No. 3, Sep. 2019, pp. 70-77.

* cited by examiner

Select energy source from energy sources connected to base station based on selecting energy rate of one energy source correlated in time with radio traffic power usage of the base station from a plurality of energy rates correlated in time for each energy source with a radio traffic power usage of the base station, where the selected energy rate improves at least one operating parameter of the selected energy source ⟋— 901

Activate the selected energy source for use by the base station ⟋— 903

METHODS FOR SELECTION OF ENERGY SOURCE BASED ON ENERGY RATE CORRELATED WITH RADIO TRAFFIC POWER USAGE AND RELATED APPARATUS

TECHNICAL FIELD

The present disclosure relates generally to selecting an energy source from a plurality of energy sources connected to a base station in a radio access network based on an energy rate of the energy source correlated in time with a radio traffic power usage of the base station, and related apparatus.

BACKGROUND

Multiple alternative electric energy sources may be used in a radio base station (RBS) site and across most telecommunication sites. Each energy source may have several attributes and operational properties such as efficiency and different performance indexes, power delivery capacity, operating cost, as well as service and maintenance costs. Importantly, each energy source may vary greatly in respect to how much $CO_2$ emission each source contributes through its operation. In addition to on-grid traditional sources, examples of available power sources may include renewable energy sources such as photovoltaic panels (PV), wind turbines (WT), as well as other sources such as battery storage and diesel engine generators.

SUMMARY

According to some embodiments of inventive concepts, a method performed by a control node for a radio access network may be provided. The control node may select an energy source from a plurality of energy sources connected to a base station. The selection may be based on selecting an energy rate of one of the energy sources correlated in time with a radio traffic power usage of the base station from a plurality of energy rates correlated in time for each energy source with a radio traffic power usage of the base station. The selected energy rate may improve at least one operating parameter of the selected energy source. The control node may further activate the selected energy source for use by the base station.

According to some other embodiments of inventive concepts, a control node may be provided. The control node may include at least one processor, and a memory coupled with the at least one processor to perform operations. The operations may include selecting an energy source from a plurality of energy sources connected to a base station. The selection may be based on selecting an energy rate of one of the energy sources correlated in time with a radio traffic power usage of the base station from a plurality of energy rates correlated in time for each energy source with a radio traffic power usage of the base station. The selected energy rate may improve at least one operating parameter of the selected energy source. The operations may further include activating the selected energy source for use by the base station.

According to some embodiments, a computer program may be provided that includes instructions which, when executed on at least one processor, cause the at least one processor to carry out methods performed by the control node.

According to some embodiments, a computer program product may be provided that includes a non-transitory computer readable medium storing instructions that, when executed on at least one processor, cause the at least one processor to carry out methods performed by the control node.

According to some embodiments of inventive concepts, a method performed by a global control node in a cloud network in communication with a plurality of control nodes for a radio access network may be provided. The global control node may receive a control policy from a first control node. The control policy may include a plurality of outputs of an offline machine learning model. Each of the plurality of outputs of the offline machine learning model may include an energy rate of the energy source correlated in time with a radio traffic power usage of the base station for a selected energy source from a plurality of energy sources connected to a base station mapped to a reward value that improved an operating parameter for the selected energy source. The global control node may further send, on a periodic basis, the control policy to a second control node.

According to some other embodiments of inventive concepts, a global control node may be provided. The global control node may include at least one processor, and a memory coupled with the at least one processor to perform operations. The operations may include receiving a control policy from a first control node. The control policy may include a plurality of outputs of an offline machine learning model. Each of the plurality of outputs of the offline machine learning model may include an energy rate of the energy source correlated in time with a radio traffic power usage of the base station for a selected energy source from a plurality of energy sources connected to a base station mapped to a reward value that improved an operating parameter for the selected energy source. The operations may further include sending, on a periodic basis, the control policy to a second control node.

According to some embodiments, a computer program may be provided that includes instructions which, when executed on at least one processor, cause the at least one processor to carry out methods performed by the global control node.

According to some embodiments, a computer program product may be provided that includes a non-transitory computer readable medium storing instructions that, when executed on at least one processor, cause the at least one processor to carry out methods performed by the global control node.

Other systems, computer program products, and methods according to embodiments will be or become apparent to one with skill in the art upon review of the following drawings and detailed description. It is intended that all such additional systems, computer program products, and methods be included within this description and protected by the accompanying claims.

Operational advantages that may be provided by one or more embodiments may include that a control agent is used for dynamic adaption and controlling selection of energy sources for effective operation. A further advantage may provide creating a fingerprint/blueprint for each energy source, based on power/time. A further advantage may provide lower cost (Total Cost of Ownership (TCO)) by using and connecting the radio traffic power to the appropriate energy source. Further advantages may provide predictive analysis for controlling selection of energy sources; analysis in case of upgradation and/or modification of the site for adapting and controlling selection of energy sources; and lower carbon emissions based on the adaption and controlling selection of energy sources.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Various embodiments will be described more fully hereinafter with reference to the accompanying drawings. Other embodiments may take many different forms and should not be construed as limited to the embodiments set forth herein; rather, these embodiments are provided by way of example to convey the scope of the subject matter to those skilled in the art. Like numbers refer to like elements throughout the detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following explanation of potential problems is a present realization as part of the present disclosure and is not to be construed as previously known by others. While a plurality of energy sources may be available for connection to a base station, efficient selection and control of the energy sources for improved or optimized operation of an energy source may not be present.

Some approaches for connecting an energy source to a radio base station may not coordinate how different energy sources are utilized in a telecommunications site, particularly when considering different radio loads and variations of energy needs pertaining to each site over the course of the life of each site.

In some approaches, energy sources may be connected passively to radio units, without consideration regarding the selection of the energy sources according to their environmental, operational, efficiency and performance attributes.

There are, proposed herein, various embodiments which may address one or more of the issues described herein. Certain embodiments may provide one or more of the following technical advantages. Various embodiments may provide a control agent for dynamic adaption and controlling selection of energy sources for effective operation. Various embodiments may provide creating a fingerprint/blueprint for each energy source, based on power/time. Thereby the methods of various embodiments may provide lower cost (Total Cost of Ownership (TCO)) by using and connecting the radio traffic power to the appropriate energy source. Various embodiments may further provide predictive analysis for controlling selection of energy sources; analysis in case of upgradation and/or modification of the site for adapting and controlling selection of energy sources; and lower carbon emissions based on the adaption and controlling selection of energy sources.

Various embodiments may provide apparatus and methods for creating or defining an energy pool of sources connected to a base station (also referred to herein as an "RBS site"). An energy source in the energy pool may be selected based on one or more suitable operating points and/or conditions by selecting an appropriate energy source based on energy source energy rate (e.g., power versus time) correlated in time with a radio traffic power usage at the base station. Suitable operating points and/or conditions (also referred to herein as an "operating parameter(s)") may include, but are not limited to, for example an operating efficiency, an operating cost, and/or an estimated carbon footprint/emission of the selected energy source.

As used herein, an energy rate (e.g., power versus time) of an energy source correlated in time with a radio traffic power usage of a base station may be referred to as an "energy blueprint". An energy blueprint may be provided in any form (e.g., a table, a chart, a plot, a mapping, a database, etc.).

Reinforcement Learning (RL) may offer a framework for controllers (also referred to herein as a "control node(s)") to learn a goal-oriented control policy from interactions with a live system or a simulation model. RL may include machine learning that includes an agent, where the agent learns how to take actions in scenarios in an environment so as to maximize a reward value. Inputs to RL may include an initial state from which the RL model may start, and subsequent states. There may be multiple possible actions that may be output from the RL model for a scenario. The agent may decide on an action to output based on a maximum reward value. The agent may continue to learn from processing additional situations and reward values.

An accurate machine learning model or machine learning model representation may be important for building an energy control methodology. Moreover, performance of a machine learning model may degrade significantly as the model is applied from simpler systems (e.g., a single radio site) to more complex systems (e.g., a network of radio sites). A possible alternative to model-based control may be a machine learning model-free approach which can work independently as well as without prior knowledge of system states. A model-free approach may be of great interest as effort may be considerable to capture variations of certain properties within the model across a multitude of radio site microgrids that are located at diverse geographical locations. For example, the effort to capture climate related variations (e.g. solar radiation, ambient temperature, etc.), may not be efficient or even tangible to try to catalog and map how solar radiation varies at each site a-priori.

Figure 1:
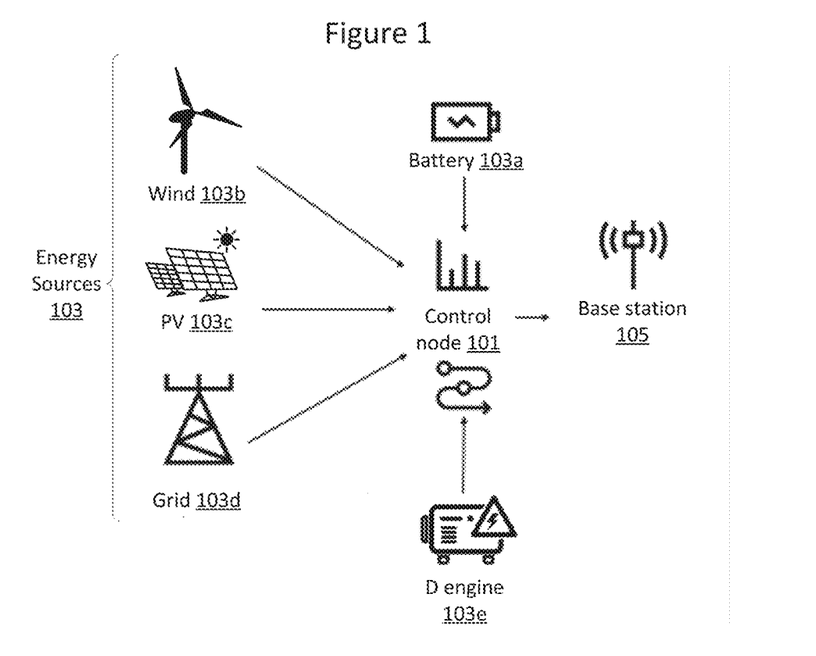
FIG. 1 illustrates an overview diagram of a control node connected to a plurality of energy sources and in communication with a base station in accordance with various embodiments of the present disclosure.

FIG. 1 illustrates an overview diagram of a control node 101 connected to a plurality of energy sources 103a-e and in communication with a base station 105 in accordance with various embodiments. Referring to FIG. 1, control node 101 may be connected to a plurality of energy sources 103a-e. Energy sources 103a-e may include for example, without limitation, battery 103a, wind turbine 103b, photovoltaic panels 103c, on-grid power lines 103d, diesel engine 103e, etc. Control node 101 also may be in communication with base station 105 (also referred to herein as a radio base station or RBS).

In some embodiments, a method may be performed by control node 101 that may include extracting an energy blueprint of each energy source 103a-e connected to a base station 105 site. The method may include correlating, in time, the energy blueprint with a corresponding operating radio load of the base station 105 site for each operating parameter. Each energy source 103a-e may have different characteristics that can be extracted based on operation behavior of the energy source, which in turn may be affected or influenced by other variables such as environmental properties and/or operational costs.

Figure 2:
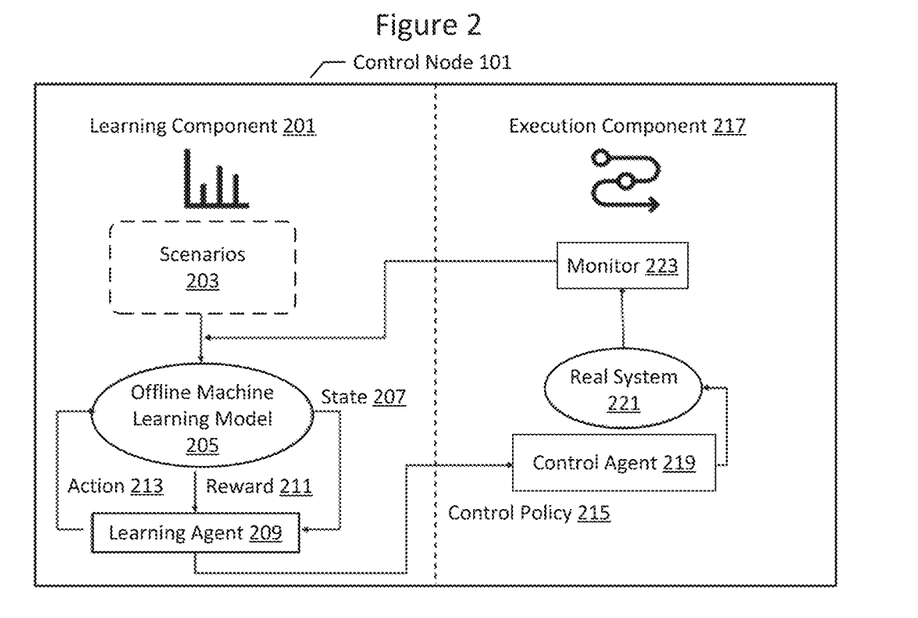
FIG. 2 illustrates a block diagram of elements of a control node that are configured according to some embodiments of the present disclosure.

FIG. 2 illustrates operations that may be performed by control node 101 in accordance with some embodiments of the present disclosure. Control node 101 may include a learning component 201 and an execution component 217.

Referring first to learning component 201 of control node 101, in various embodiments, learning component 201 may include an offline machine learning model 205 for evaluating scenarios 203 for selecting an energy source from a plurality of energy sources connected to a base station. Offline machine learning model 205 may include a RL algorithm and a learning agent 209. The RL algorithm may perform actions 213 based on a state(s) 207. Offline machine learning model 205 may compare an expected reward value to an actual reward value 211 after each performed action 213 and then improve the estimated state(s) value 207 based on what learning agent 209 learned from the actual reward value 211 given. A group of actions 213 may be provided in control policy 215. Each action 213 in control policy 215 may have provided the greatest reward value 211 in a given scenario corresponding to each action 213. Periodically, learning agent 209 may provide control policy 215 to control agent 219 of control node 101.

In various embodiments, an offline machine learning model 205 may be provided at control node 101 because interaction with an online system (e.g., base station 105) in a radio access network may be a concern since exploration in the search for an improved policy in RL may create unsafe and unreliable situations in the radio access network.

Still referring to FIG. 2, in various embodiments, execution component 217 may include a control agent 219. The control agent 219 may receive control policy 215 from learning component 201. The control agent 219 may use the knowledge gained from learning component 201 in control policy 215 to make improved decisions for selecting and controlling an energy source from a plurality of energy sources connected to a base station.

The control agent 219 may be a greedy control agent. A greedy control agent may operate to find an action from control policy 215 which provides the greatest reward value 211 for selecting an energy source 103 from a plurality of energy sources 103a-e connected to a real, operating base station (e.g., base station 105). Learning agent 209 may learn a policy which tells learning agent 209 what actions to take under circumstances that may have provided the greatest reward value 211 for each circumstance. Periodic transfer of a learned control policy 215 to control agent 219 may ensure improvement in selections of energy sources in time.

As described further below, in various embodiments, execution component 217 also may include a monitor module 223 that monitors the real system (e.g., base station 105 operating while connected to an energy source 103). Monitor module 223 may provide information from the monitoring to offline machine learning model 205 for use in further evaluations performed by offline machine learning model 205.

In some embodiments, a model-free Markov based RL algorithm may be provided at offline machine learning model 205 at control node 101. A principle behind a model-free Markov-based RL algorithm may be that the learning agent 209, via trial-and-error can determine behaviors and make improved or optimal decisions without supervision by learning to map situations to actions 213 that may maximize a subsequent numerical reward signal/value 211. Use of such a RL algorithm may fit a goal of various embodiments for performing energy efficient control as such a RL algorithm may computationally simplify the process given a relatively large number of state-action pairs which may grow exponentially with complex states and actions. A model-free Markov based RL algorithm also may offer the possibility to work on continuous and large datasets, which may be included in various embodiments.

In some embodiments, learning agent 209 of control node 101 may create an energy blueprint of each energy source 103. Control node 101 may use offline machine learning model 205 (e.g., a RL algorithm) and differentiate different operating parameters (e.g., different operating conditions/operating points) for each energy source in a plurality of energy sources 103.

In some embodiments, a local control node 101 may include a learning agent 209. The learning agent 209 may collect energy rate information and operating parameters of each energy source in the energy source pool 103a-e. The learning agent 209 may provide the collected information as input to an offline machine learning model 205 which includes a RL algorithm, where it may be processed locally in the baseband (BB). The offline machine learning model 205 may evaluate an action 213 that may maximize/minimize the selected operating parameters (e.g., operating cost or approximate carbon emission associated with the selected energy source) based on a current state 207 of the energy source and a reward function 211, all of which may be encapsulated in learning agent 209. The control agent 219 may be used for dynamic adaptation and control selection of energy sources 103a-e for improved operation.

In some embodiments, the output of the offline machine learning model 205, may be an energy blueprint for improved performance and radio load corresponding to well suited operating performance (including key performance indicators (KPI)). KPI may include one or more operating parameters.

Embedding learning methods into control schemes may be an effective way to endow the controllers (e.g., control nodes 101) with capability to learn how to take novel actions 213 and update their decision making as they observe the state 207 of the system together with the effects of their actions. This may provide improved control strategy which may reduce the energy costs of a radio site microgrid between 5% and 20%, while at the same time utilizing primarily carbon-friendly energy sources.

An energy blueprint in time, may be generated and stored for every energy source connected to a base station 105. An energy blueprint may be recalled and selected by another RL model located at another base station based on the energy efficiency of the energy blueprint of the selected energy source corresponding to an operating condition of the selected energy source.

As described above, some benefits for the operator of a base station 105 may be lower total cost of operation (TCO) and a decreased carbon emission footprint, among other benefits discussed above.

By creating a control agent 219 for energy sources connected to a base station, a decision of a control methodology for selecting one of the energy sources may be improved for each of the energy sources.

In some embodiments, the energy sources each may have their own energy blueprint generated. The energy blueprints may be sent to the control agent 219 for a decision regarding which energy source to activate for a base station.

A complex system for increased energy control may consider different factors, such as variation of energy consumption that occurs during operation, performance efficiencies and availability of the various energy sources, and environmental parameters which may have a substantial impact on the system's performance. Therefore, the control method may account for some of all of these factors.

Figure 3:
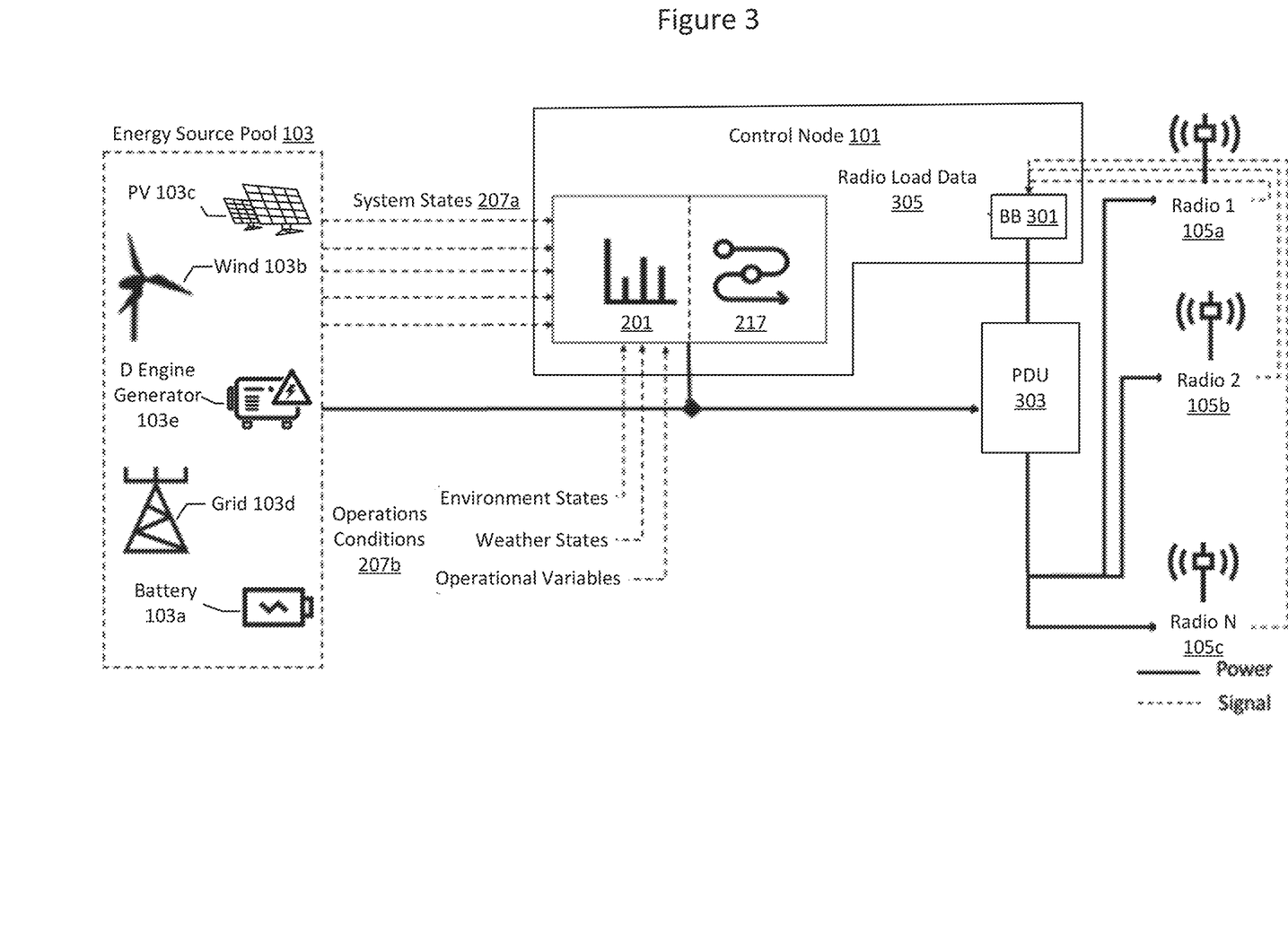
FIG. 3 illustrates an overview diagram of a control node connected to a plurality of energy sources and in communication with radios at a base station site in accordance with various embodiments of the present disclosure.

FIG. 3 further illustrates operations that may be performed by control node 101 for selecting an energy source from a pool of energy sources 103a-e in accordance with some embodiments of the present disclosure. Energy source pool 103a-e may include the main energy sources that are available in a radio site microgrid. Energy source pool 103a-e may be a composition of a variety of sources including, but not limited to, for example power line grid 103d, PV 103c, WT 103b, batteries 103a, diesel engine generators 103e, etc. Each of the energy sources 103a-e may send status and performance information (e.g., in the form of performance manager (PM) counters) to control node 101. This information may be used to measure energy capacity and availability, calculate cost and carbon footprint, and/or to guide the learning of the control strategies formed when using each energy source 103a-e.

In addition to learning component 201 and execution component 217, in some embodiments, control node 101 may further include a baseband scheduler 301 (also referred to herein as BB 301 or BB scheduler 301) and a power distribution unit 303 (also referred to herein as PDU 303). Control agent 219 (not shown in FIG. 3) may be located inside BB scheduler 301. If control agent 219 is located inside BB scheduler 301, BB scheduler 301 may collect radio load data from a base station (e.g., base station 105), process the radio load data and provide the radio load data to execution component 217 of control node 101. PDU 303 may receive power from an energy source 103a-e and may distribute power to one or more radios 105a, 105b, 105c at a base station 105 site according to the selection of energy source(s) 103a-e made by control node 101.

Still referring to FIG. 3, in various embodiments, control node 101 may be used both for internally simulating offline the radio access network, various environment situations in the form of scenarios 203. Control node 101 also may construct a state-action space model for storing and selecting the control policies 215 that were optimized in the simulated scenarios in combination with state 207 and other variables, such as from monitor module 223. Control node 101 may use considerable computational capacity and may be responsible for optimizing the corresponding objectives at a local level, such as a radio site microgrid. Offline machine learning model 205, learning agent 209, and control agent 219 may be deployed at or near a base station, in the BB scheduler 301 (depending on the resource availability of BB Scheduler 301), or in a cloud network in communication with the radio access network. Besides the optimization process, control node 101 may be responsible for relaying as well as receiving optimal energy source control policies 215 based on the most efficient operating point of each energy source or combinations of those, in relation to radio traffic demand.

While various embodiments are described with reference to a control node 101 with a local agent, instead of local agent, control node 101 may be a central machine learning component for selecting an energy source from a plurality of energy sources available to a base station based on the availability of resources.

Still referring to FIG. 3, in various embodiments, inputs to the offline machine learning agent 205 at control node 101 may include system states 207a and operational conditions 207b of the system based on variables. System, states 207a may include, but are not limited to, variables such as list of equipment (e.g., identity of each available energy source 103a-e), equipment temperature, input from energy sources 103a-e depending on the sources used/available (which may include individual energy source state (e.g., available, not available, connected, not connected, etc.), state of charge of each energy source 103a-e, PM counters (e.g. voltage, power and current statuses of each energy source 103a-e, etc.), cooling system for each energy source 103a-e, time of day, month, day of month, energy load of each energy source 103a-e, power saving states of each energy source 103a-e, etc. Operational conditions 207b may include, but are not limited to, variables such as environment states, weather states, and operational variables such as weather conditions/forecast, air temperature, time of day, month, day of month, radio load (including forecasting), solar radiation, wind speed, etc.

Outputs of control node 101 may include actions 213 that may control a state of an energy source 103a-e (e.g., activate connection, deactivate connection, etc.), selection of an energy source 103a-e, configuration of a selected energy source 103, etc.

Figure 8:
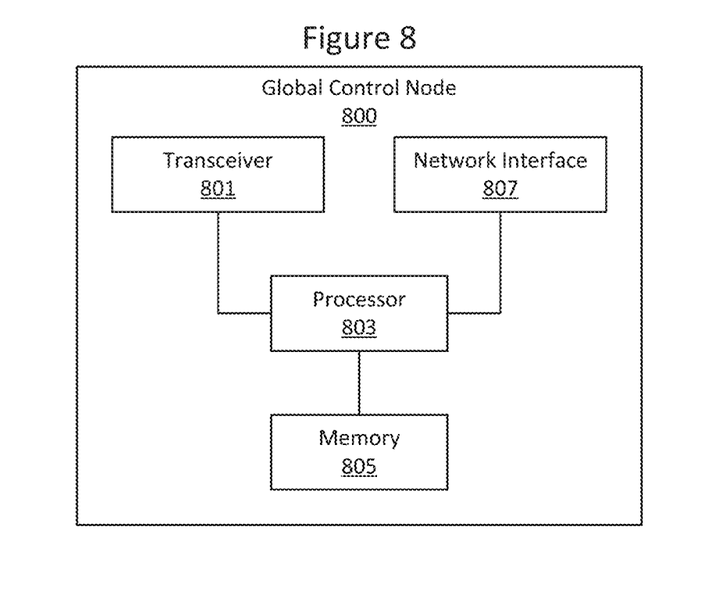
FIG. 8 illustrates a block diagram of elements of a global control node that are configured in accordance with some embodiments of the present disclosure.

In various embodiments, optimization objectives for a global agent (higher level) 800 (described further below) and local energy-decision agents of control node 101 (learning component 201 and control agent 219) may include, but are not limited to, lower energy consumption, better energy preservation, reduced operational cost, and reduced $CO_2$ emissions.

In some embodiments, learning strategies that may be used at control node 101 may include a model-free Markov based RL algorithm including, for example, Q-Learning using an iterative or tabular method. Q-learning may find a control policy 215 that may be optimal or improved in the sense that the control policy 215 may maximize the expected value of a total reward 211 over successive iterations, starting from a current state 207.

In some embodiments, methods for multi-agent RL for multi-site super-agent control optimization may also be performed. A super-agent may compare the performance of local energy decision agents at control nodes 101, and propose improvements based on the differentials comparing the sites. Hierarchical RL may be performed for multi-site energy management.

Figure 4:
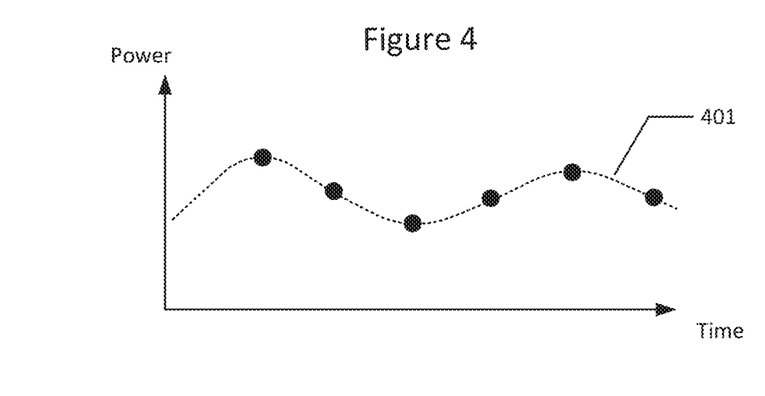
FIG. 4 illustrates an exemplary energy blueprint selected for an energy source from a plurality of energy blueprints in accordance with various embodiments of the present disclosure.

FIG. 4 illustrates, for various embodiments, an exemplary optimized energy blueprint 401 selected for an energy source from a plurality of energy blueprints of a plurality of energy sources 103. Energy blueprint 401 illustrates an energy rate of an energy source 103 correlated in time with a radio traffic power usage of a base station (e.g., base station 105). Each of the points shown on the plot of energy blueprint 401 represents a dynamic operating point of interest. While energy blueprint 401 is illustrated as a plot of power versus time of energy source 103, the various embodiments described herein are not so limited. For example, an energy rate of an energy source 103 correlated in time with a radio traffic power usage of the base station may be provided in any form (e.g., a table, a chart, a plot, a mapping, a database, etc.).

Figure 5:
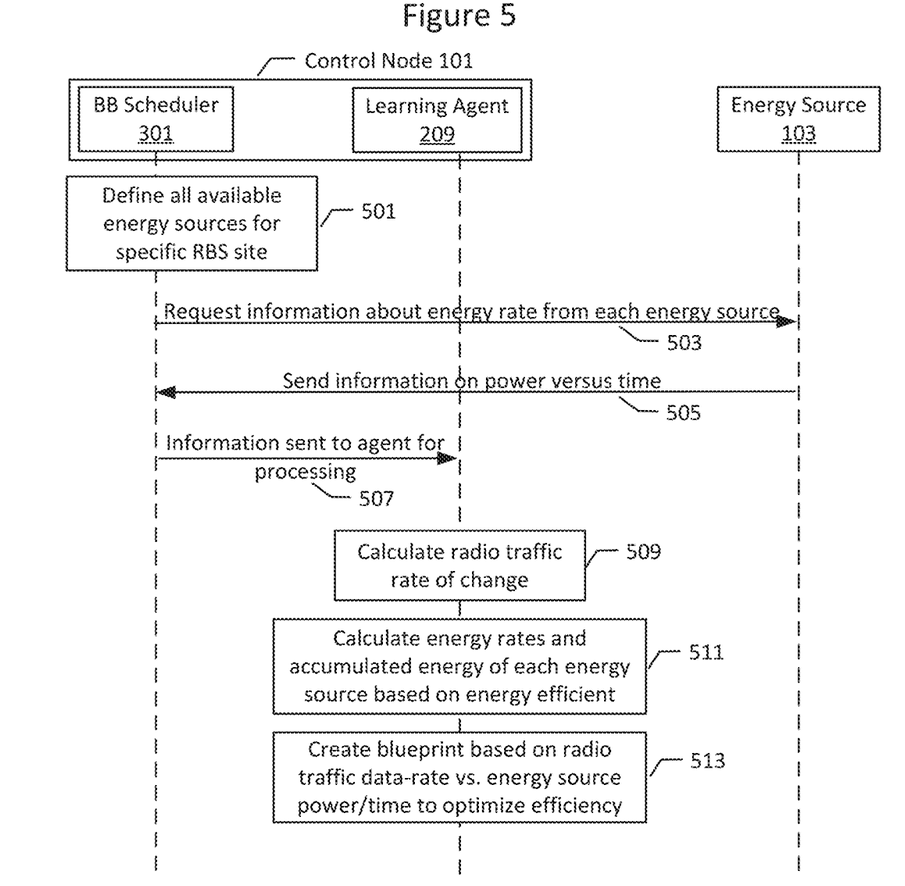
FIG. 5 illustrates operations that may be performed by a control node in accordance with some embodiments of the present disclosure.
Figure 6:
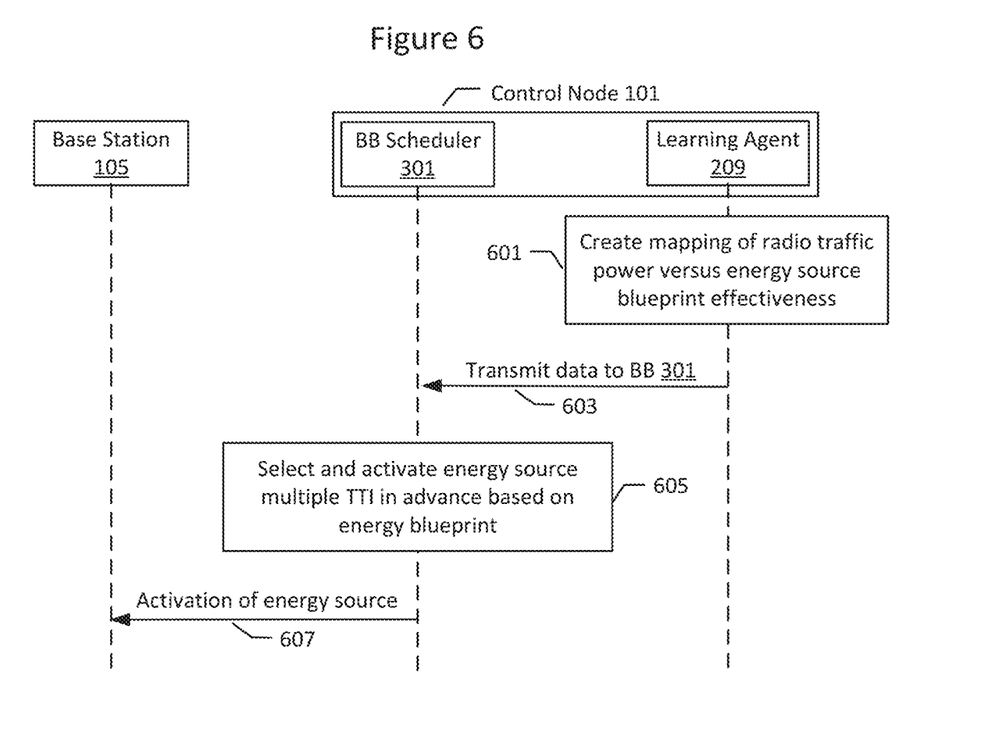
FIG. 6 illustrates operations that may be performed by a control node in accordance with some embodiments of the present disclosure.

FIGS. 5 and 6 illustrate operations that may be performed in accordance with various embodiments.

Referring to FIG. 5, in some embodiments, control node 101 may include BB scheduler 301 and learning agent 209. Control node 101 may be in communication with one or more energy sources 103*a-e*. At operation 501, BB scheduler 301 may define (e.g., identify) all energy sources 103*a-e* available to be connected to a specific radio base station (RBS) site (e.g., base station 105). For each available energy source 103*a-e*, BB scheduler 301 may request 503 energy rate information from each energy source 103*a-e*. The energy rate information may include an energy rate (e.g., power usage versus time) of the energy source 103*a-e* while connected to base station 105 correlated to radio traffic power usage of the base station (e.g., base station 105). Responsive to request 503, each energy source 103*a-e* may send 505 the requested energy rate information to BB scheduler 301. BB scheduler 301 may send 507 the energy rate information received from energy source 103*a-e* to learning agent 209 for processing.

The processing may include calculating 509 a radio traffic rate of change of base station 105. The processing may further include calculating energy rates and accumulated energy of each energy source 103*a-e* based on energy efficiency. The processing may further include creating an energy blueprint 401 for each energy source 103*a-e*. Each energy blueprint 401 may include the energy rate of the energy source correlated in time with the radio traffic power usage of the base station. Each energy blueprint 401 may improve or optimize at least one operating parameter of the energy source 103*a-e* for the applicable energy blueprint 401. Operating parameters may include, but are not limited to, an operating efficiency of each energy source 103*a-e*, an operating cost of each energy source 103*a-e*, and/or an estimated carbon emission of each energy source.

Further operations that may be performed by BB scheduler 301 and learning agent 209 of control node 101 include operations illustrated in FIG. 6. For each energy source, learning agent 209 may create 601 a correlation of radio traffic power usage of base station 105 to the energy rate of energy source 103*a-e*, where each correlation improved or optimized at least one operating parameter of the energy source 103*a-e* for the applicable correlation. Learning agent 209 may transmit 603 the correlation to BB scheduler 301. BB scheduler 301 may select and activate 605 one of the energy sources 103*a-e* multiple transmission time intervals (TTI) in advance based on the energy blueprint 401. At operation 607, BB scheduler may activate 607 the selected energy source 103*a-e*.

While the operations of FIGS. 5 and 6 are described for a control node 101 comprising a BB scheduler 301 and a learning agent 209, control node 101 is not so limited. As described above, in various embodiments, control node 101 may be deployed at or near a base station (not in BB scheduler 301), in BB scheduler 301 (depending on the resource availability of BB Scheduler 301), or in a cloud network in communication with the radio access network.

Figure 7:
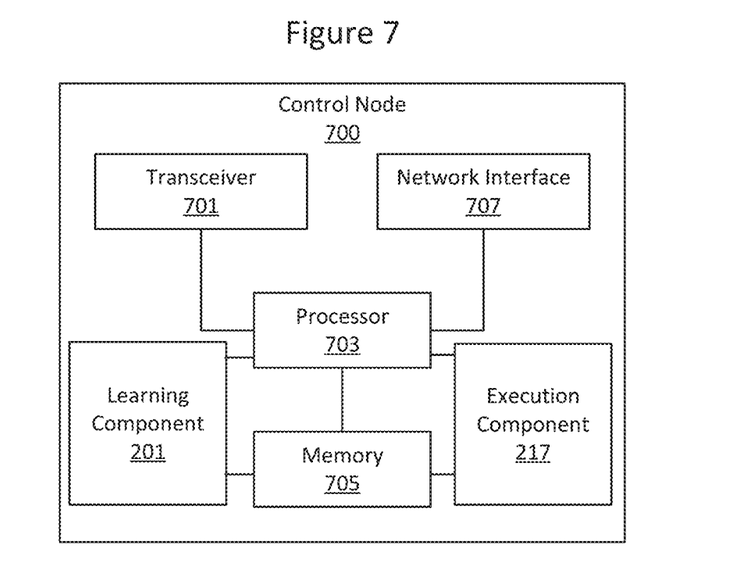
FIG. 7 illustrates a block diagram of elements of a control node that are configured in accordance with some embodiments of the present disclosure.

FIG. 7 is a block diagram illustrating an exemplary control node 700 (e.g., control node 101) for a radio access network. The control node 700 includes at least one processor circuit 703 (also referred to as at least one processor), a memory circuit 705 (also referred to as memory), and a network interface 707 (e.g., wired network interface and/or wireless network interface) configured to communicate with other network nodes. The control node 700 includes learning component 210 and execution component 217 configured to communicate with/access the at least one processor 703 and memory 705. The control node 700 may be configured as a network node containing a transceiver 701 that transmits and receives with other network nodes. The memory 705 stores computer readable program code that when executed by the at least one processor 703 causes the at least one processor 703 to perform operations according to embodiments disclosed herein.

FIG. 8 is a block diagram illustrating an exemplary global control node 800 (e.g., control node 101) for a radio access network. The global control node 800 includes at least one processor circuit 803 (also referred to as at least one processor), a memory circuit 805 (also referred to as memory), and a network interface 807 (e.g., wired network interface and/or wireless network interface) configured to communicate with other network nodes. The global control node 800 may be configured as a network node containing a transceiver 801 that transmits and receives with other network nodes. The memory 805 stores computer readable program code that when executed by the at least one processor 803 causes the at least one processor 803 to perform operations according to embodiments disclosed herein. Global control node 800 may be created or located in a cloud network in communication with a plurality of control nodes 101 for a radio access network.

Presently disclosed embodiments may provide potential advantages including, but not limited to, dynamically selecting and controlling energy sources with a control node for more effective operation. Dynamic selection and control of energy sources may provide potential advantages that may include, for example, lowering total cost of ownership (TCO) of a base station and carbon emissions may be lowered from selected energy sources. Further potential advantages may include energy source agents that may be included at the control node for use in dynamically adapting and controlling selection and control of energy sources. Yet further potential advantages of various embodiments may include creating an energy blueprint for each energy source based on power usage versus time correlated to radio traffic power usage at a base station, and selecting and controlling an energy source based on the energy blueprint correlated to the radio traffic power usage at the base station. Additional potential advantages may include predictive analysis by a control node, and analysis in case of upgrades or modifications to a base station site, based on an energy blueprint correlated to radio traffic power usage at a base station.

These and other related operations will now be described in the context of the operational flowcharts of FIGS. 9-14 according to some embodiments of inventive concepts. FIGS. 9-13 are flowcharts of operations that may be performed by a control node. FIG. 14 is a flowchart of operations that may be performed by a global control node.

Figure 9:
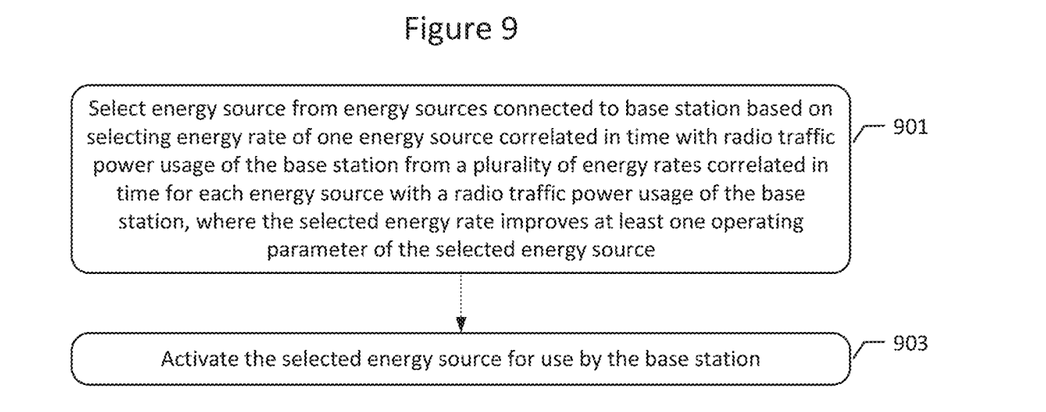
FIGS. 9-14 are flowcharts illustrating operations that may be performed by a control node in accordance with some embodiments of the present disclosure.

Referring initially to FIG. 9, operations can be performed by a control node (e.g., 700 in FIG. 7) for a radio access network. The operations include selecting 901 an energy source (e.g., energy source 103a) from a plurality of energy sources (e.g., energy sources 103a-e) connected to a base station (e.g., base station 105) based on selecting an energy rate (e.g., energy blueprint 401) of one of the energy source correlated in time with a radio traffic power usage of the base station (105) from a plurality of energy rates (401) correlated in time for each energy source with a radio traffic power usage of the base station (105). The selected energy rate (401) improves at least one operating parameter of the selected energy source. The operations further include activating 903 the selected energy source for use by the base station.

The at least one operating parameter may include an operating efficiency of the selected energy source, an operating cost of the selected energy source, and/or an estimated carbon emission of the selected energy source.

Figure 10:
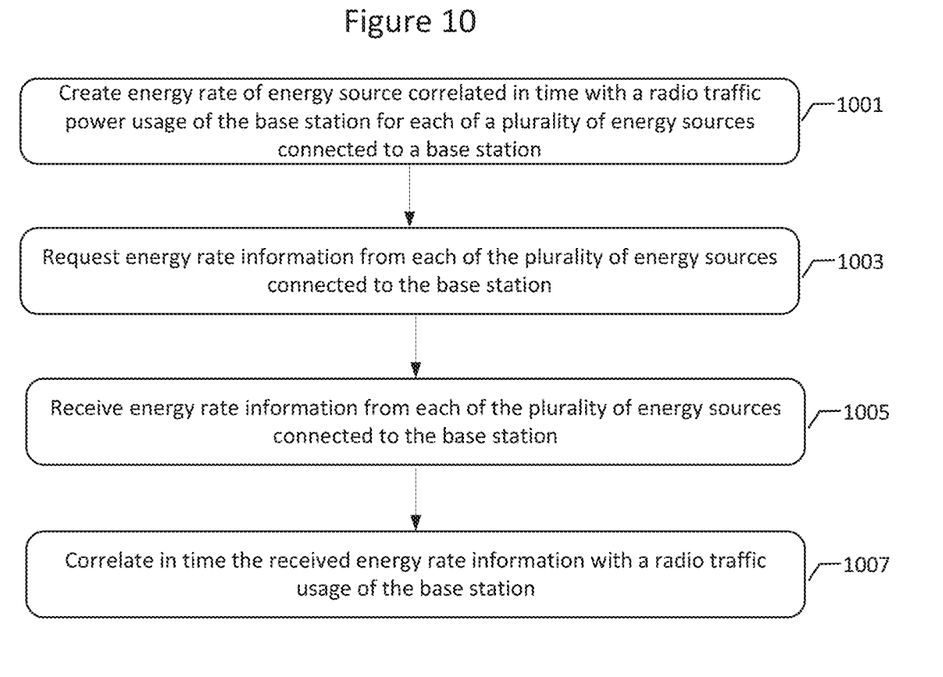

Referring next to FIG. 10, in at least some embodiments, further operations that may be performed by the control node may include creating 1001 energy rate of the energy source correlated in time with a radio traffic power usage of the base station for each of a plurality of energy sources connected to a base station. The creating 1001 may include requesting 1003 the energy rate information from each of the plurality of energy sources connected to the base station. The operations may further include, responsive to the request, receiving 1005 the energy rate information from each of the plurality of energy sources connected to the base station. The operations may further include, for each of the plurality of energy sources connected to the base station, correlating 1007 in time the received energy rate information with a radio traffic usage of the base station.

Figure 11:
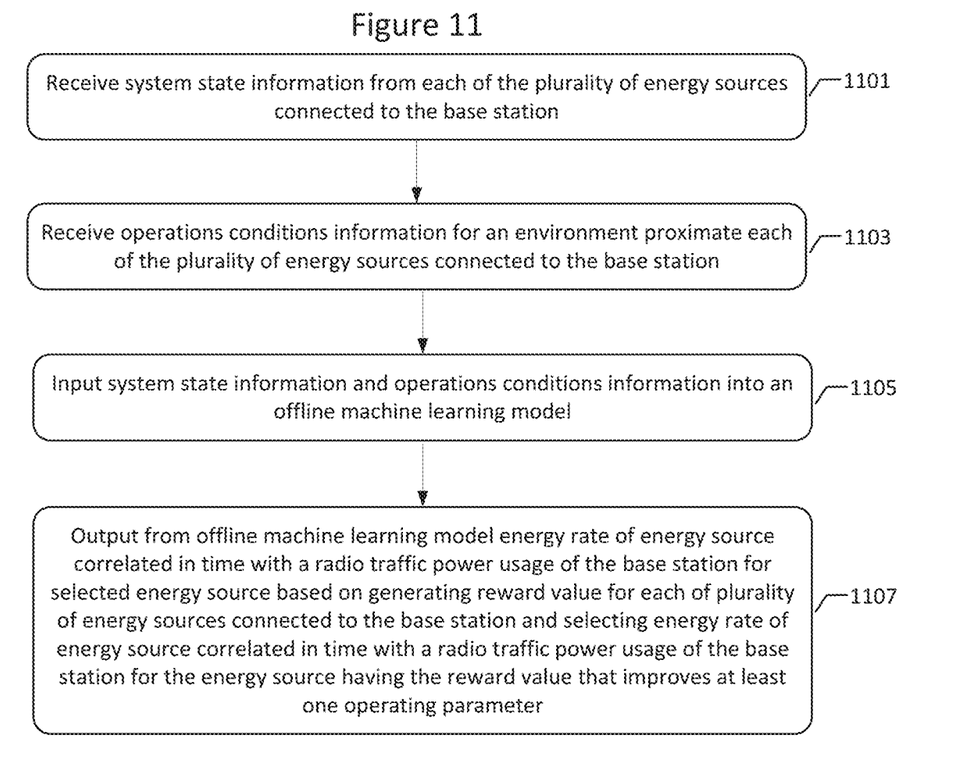

Referring to FIG. 11, in at least some embodiments, further operations that may be performed by the control node may include receiving 1101 system state information from each of the plurality of energy sources connected to the base station. The operations may further include receiving 1103 operations conditions information for an environment proximate each of the plurality of energy sources connected to the base station. The operations may further include inputting 1105 the system state information and the operations conditions information into an offline machine learning model 205. The operations may further include outputting 1107 from the offline machine learning model the energy rate of the energy source correlated in time with a radio traffic power usage of the base station (401) for the selected energy source based on generating a reward value (211) from the system state information (207a) and the operations conditions information (207b) for each of the plurality of energy sources (103) connected to the base station and selecting the energy rate of the energy source correlated in time with a radio traffic power usage of the base station for the energy source having the reward value that improves the at least one operating parameter.

The offline machine learning model 205 may include a model-free reinforcement learning algorithm. The model-free reinforcement learning algorithm may include a Q-learning algorithm.

The system state information (e.g., 207a) for each of the plurality of energy sources connected to the base station may include one or more of: a state of the energy source; a state of charge of the energy source; a solar radiation value of the energy source; a wind speed value proximate the energy source; a performance measurement counter data for the energy source; a cooling system value for the energy source; a time of the day at the energy source; an identity of a month at the energy source; an energy load of the energy source; a radio load of the energy source; and at least one power saving state of the energy source. The radio load of the energy source may include different radio-traffic loads at different time times of the day and/or month.

The operations conditions information (e.g., 207b) for an environment proximate each of the plurality of energy sources connected to the bases station may include one or more of: a weather condition proximate the energy source; an air temperature proximate the energy source; a list of equipment located at the energy source; and a temperature of the energy source.

Figure 12:
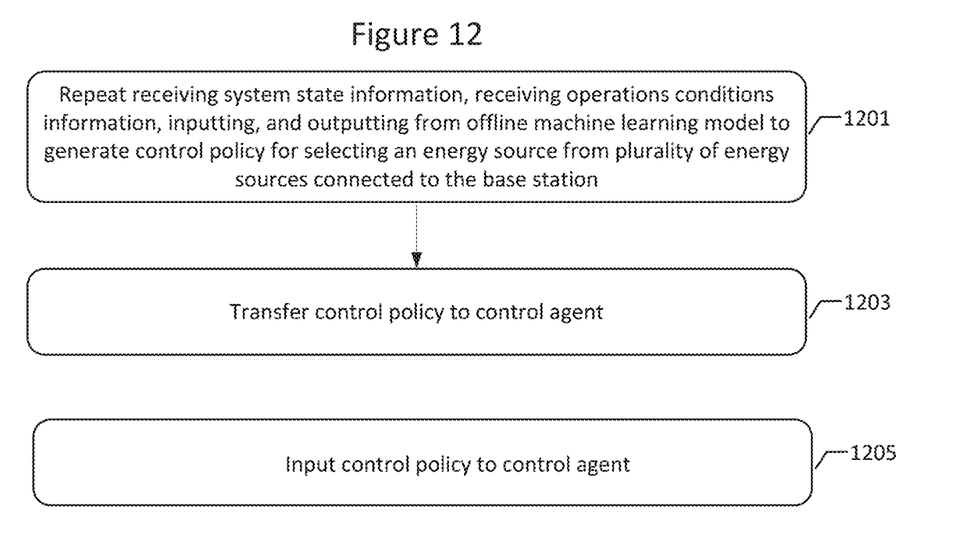

Referring to FIG. 12, in at least some embodiments, further operations that may be performed by the control node may include repeating 1201 the receiving 1101 system state information (e.g., 207a), the receiving 1213 operations conditions information (e.g., 207b), the inputting 1105, and the outputting 1107 from the offline machine learning model (e.g., 205) to generate a control policy (e.g., 215) for selecting an energy source from the plurality of energy sources connected to the base station. The operations may further include transferring 1203, on a periodic basis, the control policy (e.g., 215) to a control agent (e.g., 219).

The control policy (e.g., 215) may include mapping each of the outputs of the offline machine learning model (e.g., 207) to the reward value (e.g., 211) corresponding to each of the outputs of the offline machine learning model that improved the operating parameter.

The control agent (219) may include a greedy control agent.

Still referring to FIG. 12, in at least some embodiments, the operations may further include inputting 1205 the control policy to the control agent (e.g., 219). Selecting the energy source from the plurality of energy sources connected to the base station may include using the greedy control agent to select the energy source based on the control policy.

Figure 13:
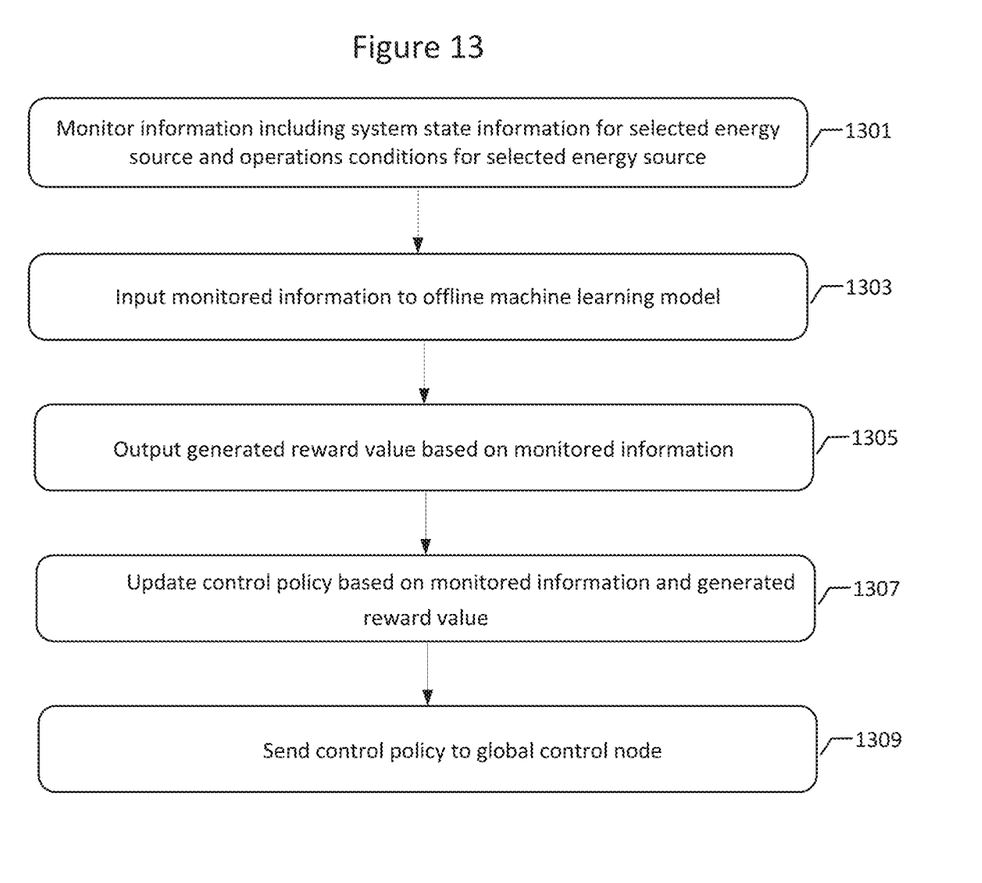
Figure 14:
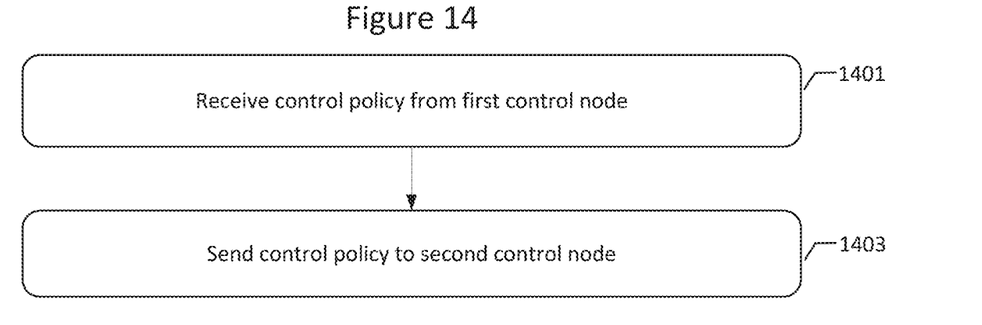

Referring to FIG. 13, in at least some embodiments, further operations that may be performed by the control node may include after the selected energy source is activated for use by the base station, monitoring 1301 information that may include the system state information for the selected energy source and the operations conditions for the selected energy source. The operations may further include inputting 1303, on a periodic basis, the monitored information (e.g., 223) to the offline machine learning model (e.g., 205). The operations may further include outputting 1305 a generated reward value (e.g., 211) based on the monitored information. The operations may further include updating 1307 the control policy (e.g., 215) based on the monitored information (e.g., 223) and the generated reward value (e.g., 211).

The control node (e.g., 101) may be located at one of: a base station (e.g., 105), in a cloud network in communication with the radio access network, and a radio access network.

Still referring to FIG. 13, in at least some embodiments, the operations may further include sending 1309 the control policy (e.g., 215) to a global control node (e.g., 800). The global control node may relay decisions of the control node (e.g., 101) to one or more control nodes (e.g., 700).

Referring next to FIG. 14, operations can be performed by a global control node (e.g., 800 in FIG. 8) for a radio access network. The operations include receiving 1401 a control policy (e.g., 215) from a first control node (e.g., 700). The control policy may include a plurality of outputs (e.g., 207, 211) of an offline machine learning model (e.g., 205). Each of the plurality of outputs of the offline machine learning model includes an energy rate of the energy source correlated in time with a radio traffic power usage of the base station (e.g., energy blueprint 401) for a selected energy source (e.g., 103a-e) from a plurality of energy sources connected to a base station (e.g., 105) mapped to a reward value (e.g., 211) that improved a operating parameter for the selected energy source. The operations further include sending 1403, on a periodic basis, the control policy (e.g., 215) to a second control node (e.g., 700).

The operations of block 1403 of the flow chart of FIG. 14 may be optional with respect to some embodiments.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method performed by a control node for a radio access network, the method comprising:

selecting an energy source from a plurality of energy sources connected to a base station based on selecting an energy rate of one of the energy sources correlated in time with a radio traffic power usage of the base station from a plurality of energy rates correlated in time for each energy source with a radio traffic power usage of the base station, wherein the selected energy rate improves at least one operating parameter of the selected energy source;
activating the selected energy source for use by the base station;
receiving system state information from each of the plurality of energy sources connected to the base station;
inputting the system state information into an offline machine learning model; and
outputting from the offline machine learning model the energy rate of the energy source correlated in time with a radio traffic power usage of the base station for the selected energy source based on generating a reward value from the system state information for each of the plurality of energy sources connected to the base station and selecting the energy rate of the energy source correlated in time with a radio traffic power usage of the base station for the energy source having the reward value that improves the at least one operating parameter.

2. The method of claim 1, wherein the at least one operating parameter comprises at least one of:
an operating efficiency of the selected energy source;
an operating cost of the selected energy source; and
an estimated carbon emission of the selected energy source.

3. The method of claim 1, further comprising:
creating the energy rate of the energy source correlated in time with a radio traffic power usage of the base station for each of a plurality of energy sources connected to a base station.

4. The method of claim 1, wherein the creating the energy rate of the energy source correlated in time with a radio traffic power usage of the base station for each of the plurality of energy sources connected to a base station comprises:
requesting the energy rate information from each of the plurality of energy sources connected to the base station;
responsive to the request, receiving the energy rate information from each of the plurality of energy sources connected to the base station; and
for each of the plurality of energy sources connected to the base station, correlating in time the received energy rate information with a radio traffic usage of the base station.

5. The method of claim 1, further comprising:
receiving operations conditions information for an environment proximate each of the plurality of energy sources connected to the base station; and
inputting the operations conditions information into the offline machine learning model;
wherein generating the reward value is further from the operations conditions information for each of the plurality of energy sources connected to the base station.

6. The method of claim 5, wherein the offline machine learning model comprises a model-free reinforcement learning algorithm.

7. The method of claim 6, wherein the model-free reinforcement learning algorithm comprises a Q-learning algorithm.

8. The method of claim 5, wherein the system state information for each of the plurality of energy sources connected to the base station comprises one or more of:
a state of the energy source;
a state of charge of the energy source;
a solar radiation value of the energy source;
a wind speed value proximate the energy source;
a performance measurement counter data for the energy source;
a cooling system value for the energy source;
a time of the day at the energy source;
an identity of a month at the energy source;
an energy load of the energy source;
a radio load of the energy source; and
at least one power saving state of the energy source.

9. The method of claim 5, wherein the operations conditions information for an environment proximate each of the plurality of energy sources connected to the bases station comprises one or more of:
a weather condition proximate the energy source;
an air temperature proximate the energy source;
a list of equipment located at the energy source; and
a temperature of the energy source.

10. The method of claim 5, further comprising:
repeating the receiving system state information, the receiving operations conditions information, the inputting, and the outputting from the offline machine learning model to generate a control policy for selecting an energy source from the plurality of energy sources connected to the base station; and
transferring, on a periodic basis, the control policy to a control agent.

11. The method of claim 10, wherein the control policy comprises mapping each of the outputs of the offline machine learning model to the reward value corresponding to each of the outputs of the offline machine learning model that improved the operating parameter.

12. The method of claim 10, wherein the control agent comprises a greedy control agent.

13. The method of claim 12, further comprising:
inputting the control policy to the control agent, and
wherein the selecting the energy source from the plurality of energy sources connected to the base station comprises using the greedy control agent to select the energy source based on the control policy.

14. The method of claim 1, further comprising:
after the selected energy source is activated for use by the base station, monitoring information comprising the system state information for the selected energy source and the operations conditions for the selected energy source;
inputting, on a periodic basis, the monitored information to the offline machine learning model;
outputting a generated reward value based on the monitored information; and
updating the control policy based on the monitored information and the generated reward value.

15. The method of claim 1, wherein the control node is located at one of: a base station, in a cloud network in communication with the radio access network, and a radio access network.

16. The method of claim 10, further comprising:
sending the control policy to a global control node, wherein the global control node relays decisions of the control node to one or more control nodes.

17. A control node configured to operate for a radio communication network, the control node comprising:
  at least one processor; and
  a memory coupled with the at least one processor, wherein the memory includes instructions that when executed by the at least one processor causes the control node to perform the operations comprising:
  select an energy source from a plurality of energy sources connected to a base station based on selecting an energy rate of one of the energy sources correlated in time with a radio traffic power usage of the base station from a plurality of energy rates correlated in time for each energy source with a radio traffic power usage of the base station, wherein the selected energy rate improves at least one operating parameter of the selected energy source;
  activate the selected energy source for use by the base station;
  receive system state information from each of the plurality of energy sources connected to the base station;
  input the system state information into an offline machine learning model; and
  output from the offline machine learning model the energy rate of the energy source correlated in time with a radio traffic power usage of the base station for the selected energy source based on generating a reward value from the system state information for each of the plurality of energy sources connected to the base station and selecting the energy rate of the energy source correlated in time with a radio traffic power usage of the base station for the energy source having the reward value that improves the at least one operating parameter.

18. The control node of claim 17, wherein the at least one operating parameter comprises at least one of:
  an operating efficiency of the selected energy source;
  an operating cost of the selected energy source; and
  an estimated carbon emission of the selected energy source.

19. A method performed by a global control node in a cloud network in communication with a plurality of control nodes for a radio access network, the method comprising:
  receiving a control policy from a first control node, wherein the control policy comprises a plurality of outputs of an offline machine learning model, and
  wherein each of the plurality of outputs of the offline machine learning model comprises an energy rate of the energy source correlated in time with a radio traffic power usage of the base station for a selected energy source from a plurality of energy sources connected to a base station mapped to a reward value that improved an operating parameter for the selected energy source; and
  sending, on a periodic basis, the control policy to a second control node.

20. A global control node configured to operate for communication with a radio communication network, the global control node comprising:
  at least one processor; and
  a memory coupled with the at least one processor, wherein the memory includes instructions that when executed by the at least one processor causes the control node to perform operations comprising:
  receive a control policy from a first control node, wherein the control policy comprises a plurality of outputs of an offline machine learning model, and
  wherein each of the plurality of outputs of the offline machine learning model comprises an energy rate of the energy source correlated in time with a radio traffic power usage of the base station for a selected energy source from a plurality of energy sources connected to a base station mapped to a reward value that improved an operating parameter for the selected energy source; and
  send, on a periodic basis, the control policy to a second control node.

* * * * *